United States Patent
Maida et al.

(10) Patent No.: US 6,990,836 B2
(45) Date of Patent: Jan. 31, 2006

(54) METHOD OF PRODUCING FLUORINE-CONTAINING SYNTHETIC QUARTZ GLASS

(75) Inventors: Shigeru Maida, Nakakubiki-gun (JP); Motoyuki Yamada, Nakakubiki-gun (JP); Hisatoshi Otsuka, Nakakubiki-gun (JP); Kazuo Shirota, Nakakubiki-gun (JP); Koji Matsuo, Nakakubiki-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 544 days.

(21) Appl. No.: 09/789,744

(22) Filed: Feb. 22, 2001

(65) Prior Publication Data

US 2001/0017042 A1    Aug. 30, 2001

(30) Foreign Application Priority Data

Feb. 23, 2000    (JP)    ............................ 2000-045657

(51) Int. Cl.
*C03B 20/00*    (2006.01)
(52) U.S. Cl. .......................................... 65/397; 65/17.4
(58) Field of Classification Search ................ 65/17.4, 65/17.6, 397, 399, 414, 416, 417, 378, 427, 65/435, DIG. 16, 413
See application file for complete search history.

(56) References Cited

U.S. PATENT DOCUMENTS

| | | | | |
|---|---|---|---|---|
| 4,221,825 A | * | 9/1980 | Guerder et al. ............. 427/452 |
| 4,345,928 A | * | 8/1982 | Kawachi et al. .............. 65/412 |
| 4,627,866 A | * | 12/1986 | Kanamori et al. ............. 65/397 |
| 5,053,068 A | * | 10/1991 | Kyoto et al. .................. 65/398 |
| 5,221,309 A | * | 6/1993 | Kyoto et al. .................. 65/416 |
| 5,326,729 A | | 7/1994 | Yaba et al. |
| 5,474,589 A | * | 12/1995 | Ohga et al. .................... 65/397 |
| 5,597,398 A | * | 1/1997 | Ishikawa et al. ............... 65/413 |
| 5,788,730 A | * | 8/1998 | Ruppert et al. ............... 65/17.4 |
| 5,879,649 A | * | 3/1999 | Henderson et al. ......... 423/337 |
| 6,265,115 B1 | * | 7/2001 | Berkey et al. ................. 430/5 |
| 6,269,663 B1 | * | 8/2001 | Drouart et al. ............... 65/391 |
| 6,376,401 B1 | * | 4/2002 | Kondo et al. ................. 501/54 |
| 6,467,313 B1 | * | 10/2002 | Chu et al. ..................... 65/399 |

(Continued)

FOREIGN PATENT DOCUMENTS

EP    0 691 312 A1    1/1996

(Continued)

OTHER PUBLICATIONS

Machine translation of JP 07-330366 obtained from http://www.ipdl.jpo.go.jp/homepg_e.ipdl on Mar. 10, 2003.*

(Continued)

*Primary Examiner*—Steven P. Griffin
*Assistant Examiner*—Carlos Lopez
(74) *Attorney, Agent, or Firm*—Millen, White, Zelano, Branigan, P.C.

(57) ABSTRACT

Synthetic quartz glass is produced by feeding a silica-forming raw material gas, hydrogen gas, oxygen gas and a fluorine compound gas from a burner to a reaction zone, flame hydrolyzing the silica-forming raw material gas in the reaction zone to form fine particles of fluorine-containing silica, depositing the silica fine particles on a rotatable substrate in the reaction zone so as to create a fluorine-containing porous silica matrix, and heat vitrifying the porous silica matrix in a fluorine compound gas-containing atmosphere. This process enables the low-cost manufacture of a synthetic quartz glass having a higher and more uniform transmittance to light in the vacuum ultraviolet region than has hitherto been achieved.

13 Claims, 4 Drawing Sheets

U.S. PATENT DOCUMENTS

| | | | |
|---|---|---|---|
| 6,541,168 B2 * | 4/2003 | Brown et al. ................... | 430/5 |
| 2002/0018942 A1 * | 2/2002 | Brown et al. ................... | 430/5 |
| 2002/0038557 A1 * | 4/2002 | Matsuo et al. ............... | 65/17.4 |

FOREIGN PATENT DOCUMENTS

| | | |
|---|---|---|
| EP | 1 035 084 A2 | 9/2000 |
| EP | 1 043 282 A1 | 10/2000 |
| EP | 1 035 084 A3 | 3/2001 |
| EP | 1 094 040 A2 | 4/2001 |
| EP | 1 103 528 A2 | 5/2001 |
| JP | 62-297239 * | 12/1987 |
| JP | 04-074728 * | 10/1992 |
| JP | 10067521 | 3/1998 |
| WO | 00/55689 | 9/2000 |

OTHER PUBLICATIONS

Patent Abstract Publication No. 55-067533 published May 21, 1980.*

Abstract of Japanese Patent 07330366, published Dec. 19, 1995.

Abstract of Japanese Patent 60086039, published May 15, 1985.

Abstract of Japanese Patent 60086044, published May 15, 1985.

Abstract of Japanese Patent 10067521, published Mar. 10, 1998.

Abstract of Japanese Patent 11116248, published Apr. 27, 1999.

* cited by examiner

METHOD OF PRODUCING FLUORINE-CONTAINING SYNTHETIC QUARTZ GLASS

BACKGROUND OF THE INVENTION

1. Field of the Invention

The present invention relates to fluorine-containing synthetic quartz glass having a high transmittance to radiation with a wavelength of up to 400 nm, and particularly to radiation in the vacuum ultraviolet region. The invention relates also to a process for producing such synthetic quartz glass.

2. Prior Art

The level of integration in semiconductor integrated circuits has continued to rise rapidly in recent years. Lithographic processes involved in the fabrication of semiconductor devices are making use of exposure light sources of increasingly short wavelengths. Today, lithography based on KrF excimer lasers, which have a wavelength of 248 nm, is becoming mainstream.

To achieve even higher levels of device integration, intensive efforts are being made to move on to shorter wavelength ArF excimer lasers (193 nm), and $F_2$ excimer lasers with a wavelength of 157 nm show considerable promise for the not-too-distant future.

High-purity quartz glass having a high transmittance to light emitted by the light sources utilized and a low thermal expansion coefficient is used in lithography systems, both in light projection optics such as stepper lens and prisms and also in photomasks (reticles). Yet, prior-art quartz glass has a transmittance that gradually decreases in what is commonly referred to as the vacuum ultraviolet region below 200 nm, and absorption ceases altogether near 140 nm. Hence, its use in optical members such as photomasks has been regarded as problematic. The feasibility of using $CaF_2$ single crystals, which have a higher transmittance than quartz glass, in lithographic system which employ exposure light sources emitting at wavelengths in the vacuum ultraviolet region has also been investigated. However, compared with quartz glass, $CaF_2$ has a high thermal expansion coefficient, a low material strength, poor processability due in part to cleavage, and a high production cost. For these and other reasons, $CaF_2$ appears to be poorly suited for use in lithography, and especially as a photomask material.

A pressing need thus exists for the development of quartz glass having a high transmittance to light in the vacuum ultraviolet region.

The decline in transmittance by quartz glass within the vacuum ultraviolet region is due primarily to absorption by structural defects in the glass. Structural defects which absorb in the vacuum ultraviolet region include primarily Si—Si bonds, Si—OH bonds, Si—O—O—Si bonds and Si—Cl bonds.

Therefore, the production of quartz glass which minimizes the formation of such structural defects and has a high transmittance in the vacuum ultraviolet region is vital to efforts for achieving the practical application of ArF and $F_2$ excimer laser-based lithography.

In particular, Si—Si bonds, sometimes referred to as "oxygen deficiency defects," have absorption bands at 163 nm and 245 nm, and thus present a problem with the use of $F_2$ excimer lasers and also KrF excimer lasers as the exposure light source. Moreover, these defects lower the durability of quartz glass, both by creating, with excimer laser irradiation, defects called E' centers which absorb at 215 nm (an effect known as "solarization") and because of the fluctuations in refractive index triggered by the compaction that arises due to the absorbed energy.

Similarly, Si—O—O—Si bonds (oxygen surplus defects), which absorb at 177 nm, form non-bridging oxygen radicals under excimer laser irradiation, causing declines in the transmittance and durability of the quartz glass.

In the course of earlier research aimed at eliminating such structural defects, a method was proposed which called for producing a porous silica matrix by flame hydrolyzing a silica-forming raw material gas, then melting and vitrifying the porous silica matrix in a fluorine atmosphere.

This prior-art process reduces the number of the above-described structural defects in quartz glass and forms Si—F bonds. New absorption owing to the introduction of such bonds does not occur in the vacuum ultraviolet region at wavelengths of 140 nm and up. The reason is that Si—F bonds have a larger band gap than the Si—O bonds in quartz glass.

Moreover, because Si—F bonds have a large bond energy and are very stable, they do not form new structural defects such as E' centers when exposed to excimer laser irradiation.

Accordingly, the formation of a high concentration of uniformly dispersed Si—F bonds within quartz glass should provide a quartz glass well-suited to use as an optical material for vacuum ultraviolet-related applications.

However, we have found it to be exceedingly difficult to produce good quartz glass having a desirable concentration and uniformity of Si—F bonds by conventional methods. That is, uniformly doping quartz glass with fluorine atoms to a high concentration of at least 2 wt % by prior-art methods is very difficult, yet lower concentrations fail to adequately curb the decrease in light transmittance. Also, high-concentration doping becomes increasingly difficult as the diameter of the porous silica matrix increases.

Moreover, vitrification of the porous silica matrix proceeds inward from the surface of the matrix. Thus, if fluorine doping is carried out at the same time, diffusion of the fluorine to the interior is inhibited by vitrification of the porous silica matrix. The inevitable result is the formation of quartz glass having a radial distribution in the fluorine atom concentration.

In addition, because the temperature of vitrification varies with the concentration of fluorine dopant, some unmelted portions may remain, resulting in incomplete vitrification. This tendency becomes increasingly acute at higher doping concentrations.

Even when vitrification is complete, uneven distribution of the fluorine atom concentration within the quartz glass causes non-uniformity in such optical properties as the transmittance and refractive index. As a result, although the quartz glass may have a high transmittance, it is poorly suited for use as a reticle substrate material because the transferred image ends up being partially out of focus. This tendency becomes increasingly pronounced as the absorption edge of quartz glass is approached, and is thus a problem which must be overcome to increase the precision of lithography.

When diffusing a fluorine compound gas into a porous silica matrix, factors believed to be effective for uniform doping include a low matrix bulk density, a small matrix diameter, and a long doping time. This is why methods have hitherto been used in which fluorine doping is carried out for an extended period of time on a low-bulk density matrix.

However, only a small amount of product can be obtained by vitrifying a low bulk density matrix. Moreover, a long doping time prolongs the production time and also increases the consumption of fluorine compound gas serving as the dopant. The resulting efficiency of production, including production costs, is much lower than that for ultraviolet-grade synthetic quartz glasses which do not contain fluorine.

Thus, to produce quartz glass having a high transmittance in the vacuum ultraviolet region, there has existed a need to develop a method for doping fluorine to a higher concentration and better uniformity than has hitherto been possible.

SUMMARY OF THE INVENTION

It is therefore an object of the invention to provide synthetic quartz glass which has been uniformly doped with fluorine to a high concentration. Another object of the invention is to provide a process which is capable of producing such synthetic quartz glass in a shorter doping time and at lower production costs.

We have found that synthetic quartz glass doped with fluorine atoms to a higher concentration and uniformity than in the prior art can be produced in a short period of time by a process in which, during creation of the porous silica matrix, a fluorine compound gas is fed from the burner together with the silica-forming raw material gas such as to form a fluorine-containing porous silica matrix, following which the matrix is heated and vitrified in a fluorine compound gas-containing atmosphere.

Additionally, because this process enables the use of a porous silica matrix having a higher bulk density than formerly possible, it vastly enhances productivity and also shortens the doping time, making it possible to greatly reduce production costs. We have thus discovered that such a process can be used for the low-cost production of quartz glass which has a high transmittance to vacuum ultraviolet region light and within which the transmittance to such light is uniform.

Accordingly, the present invention provides a process for producing synthetic quartz glass, which process comprises the steps of:

feeding a silica-forming raw material gas, hydrogen gas, oxygen gas and a fluorine compound gas from a burner to a reaction zone, flame hydrolyzing the silica-forming raw material gas in the reaction zone to form fine particles of fluorine-containing silica, depositing the silica fine particles on a rotatable substrate in the reaction zone so as to create a fluorine-containing porous silica matrix, and heating and vitrifying the porous silica matrix in a fluorine compound gas-containing atmosphere.

During formation of the porous silica matrix by the foregoing process, the silica matrix and the stream of fluorine compound gas are preferably oriented such that their respective center axes describe an angle therebetween of 120 to 150°. The porous silica matrix thus produced typically has a bulk density of at least 0.1 g/cm$^3$.

It is advantageous to additionally subject the synthetic quartz glass produced by the above-described process to heat treatment in a hydrogen gas atmosphere.

The invention also provides a synthetic quartz glass produced by the foregoing process, which synthetic quartz glass has a hydroxyl group concentration of at most 0.002% by weight and a fluorine atom concentration of at least 0.01% by weight.

Use of the above process enables quartz glass having a higher and more uniform transmittance to vacuum ultraviolet light than conventional quartz glass to be produced at a lower cost than has heretofore been possible.

BRIEF DESCRIPTION OF THE DRAWINGS

The objects, features and advantages of the invention will become more apparent from the following detailed description, taken in conjunction with the foregoing drawings.

DETAILED DESCRIPTION OF THE INVENTION

Figure 1:
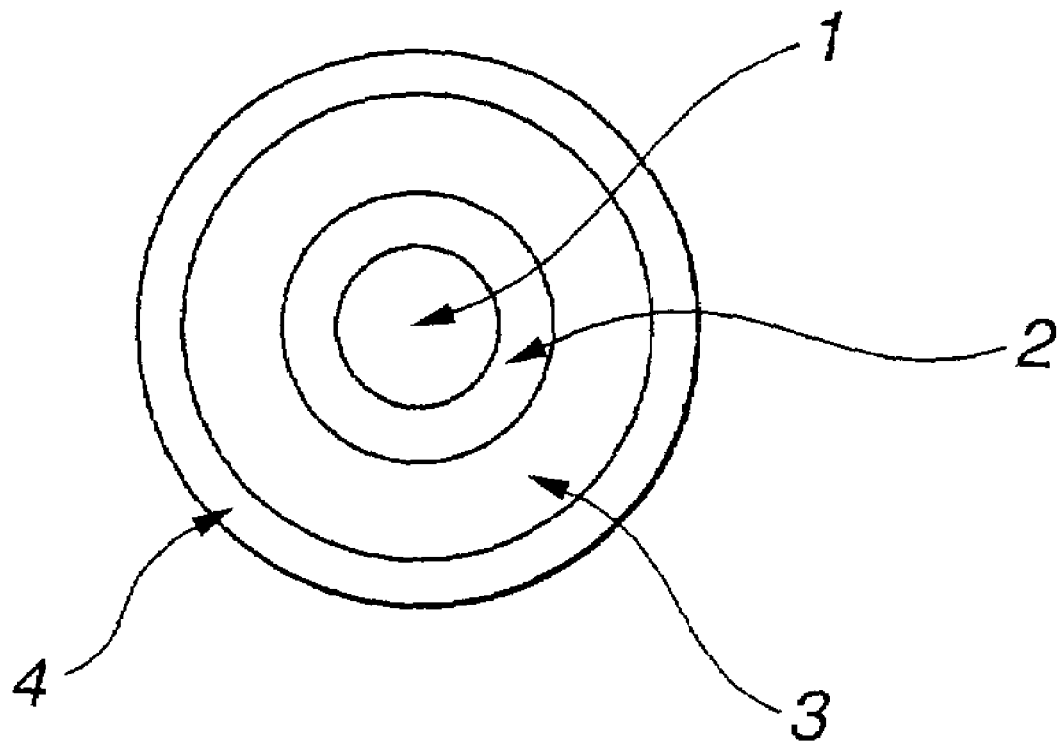
FIG. 1 is a schematic sectional view of a burner such as may be used to form a porous silica matrix in the synthetic quartz glass production process of the invention.

The inventive process for producing fluorine-containing synthetic quartz glass comprises the steps of feeding a silica-forming raw material gas, hydrogen gas, oxygen gas and a fluorine compound gas from a burner to a reaction zone; flame hydrolyzing the silica-forming raw material gas in the reaction zone to form fine particles of fluorine-containing silica; depositing the silica fine particles on a rotatable substrate in the reaction zone so as to create a fluorine-containing porous silica matrix; and heating and vitrifying the porous silica matrix in a fluorine compound gas-containing atmosphere.

In this process, fluorine doping is carried out during production of the porous silica matrix in such a way that the fluorine atom concentration increases from the outer periphery toward the center portion of the matrix. Fluorine doping is later carried out once again during vitrification of the matrix, at which time doping proceeds more readily on the outside than at the center. The combination of these two steps makes it possible to achieve fluorine doping that is uniform in the radial direction. Quartz glass having a fluorine atom concentration higher than 2 wt % can easily be obtained by such a two-step doping process.

Hence, quartz glass having a high and uniform concentration of fluorine can be achieved. This in turn makes it possible to produce synthetic quartz glass in which the formation of structural defects such as oxygen deficiency defects has been drastically reduced and which thus has an excellent tolerance to excimer laser radiation. Moreover, the above process allows doping during vitrification to be concentrated on the outside of the matrix, enabling the vitrification of a high bulk density matrix.

For reasons having to do with molecular diffusion, quartz glass is easier to uniformly dope when it has a lower density. In prior-art processes, doping is first carried out during vitrification. However, because doping takes place while vitrification proceeds from the surface of the matrix, the bulk density at the surface rises during doping, bringing about a gradual decline in the doping rate. The result is a radial drop in the dopant concentration as the center of the matrix is approached. In a conventional process, fluorine doping to a uniform and high concentration requires that a matrix having a low bulk density and a small diameter be gradually heated to the vitrification temperature, and fluorine doping carried out over an extended period of time.

By contrast, the process according to the present invention is able to vitrify in a short period of time a matrix having a higher bulk density and a larger diameter than in the prior art.

The porous silica matrix forming method used in the invention is one that is already known to the art, and may be carried out in accordance with conventional conditions, such as the gas flow rate in the burner, and using as the silica-forming raw material gas a known organosilicon compound.

Specific examples of organosilicon compounds that may be used as the raw material include chlorosilane compounds such as tetrachlorosilane ($SiCl_4$) and dimethyldichlorosilane (($CH_3$)$_2SiCl_2$), as well as silane and siloxane compounds of general formulas I to III below.

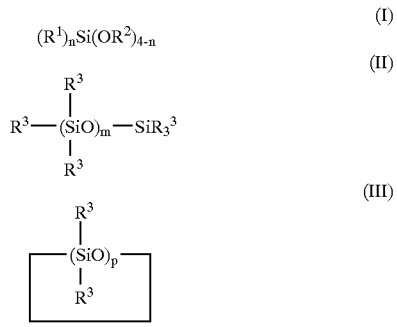

In formulas I to III, $R^1$ and $R^2$ are each independently aliphatic monovalent hydrocarbon groups; $R^3$ is a hydrogen atom or an aliphatic monovalent hydrocarbon group; the letter m is at least 1, and preferably 1 or 2; the letter n is an integer from 0 to 3; and the letter p is an integer from 3 to 5.

Illustrative examples of aliphatic monovalent hydrocarbon groups suitable as $R^1$, $R^2$ or $R^3$ include $C_{1-4}$ alkyl groups such as methyl, ethyl, propyl, n-butyl and tert-butyl; $C_{3-6}$ cycloalkyl groups such as cyclohexyl; and $C_{2-4}$ alkenyl groups such as vinyl and allyl.

Specific examples of silane compounds of above general formula I include $Si(OCH_3)_4$, $Si(OCH_2CH_3)_4$ and $CH_3Si(OCH_3)_3$. An exemplary siloxane compound of above general formula II is hexamethyldisiloxane.

Of the above compounds, an alkoxysilane containing no chlorine is preferable for avoiding ultraviolet light absorption by Si—Cl bonds.

Examples of suitable fluorine compounds include tetrafluorosilane, trifluoromethane and tetrafluoromethane.

The burner used in the invention has a plurality of nozzles arranged concentrically. Use may be made of any known burner of this type which is capable of supporting flame hydrolysis by feeding to a reaction zone a silica-forming raw material gas and a fluorine compound gas from the center nozzle, feeding oxygen gas from a second nozzle located outside the center nozzle, and feeding oxygen gas and/or hydrogen gas from one or more nozzles located outside of the second nozzle. FIG. 1 shows a typical burner suitable for use in working the invention.

Referring to FIG. 1, a center tube nozzle 1 feeds a silica-forming raw material gas and a fluorine compound gas, and a first ring tube 2 (also referred to herein as the "second nozzle") surrounding the center tube nozzle 1 feeds oxygen gas. In addition, a second ring tube 3 surrounding the first ring tube 2 feeds hydrogen gas, and a third ring tube 4 surrounding the second ring tube 3 feeds oxygen gas.

Use may be made of a plurality of burners, including one or more auxiliary burner, in which case the auxiliary burner may supply only an oxyhydrogen flame or may supply a fluorine compound gas.

To have fluorine doping during porous silica matrix formation take place from the center portion of the matrix rather than from the periphery, it is effective to feed the fluorine compound gas toward the center of the matrix.

To achieve a good distribution in the fluorine atom concentration, it is preferable for the angle between the stream of fluorine compound gas and the center axis of the porous silica matrix to be large.

Figure 2:
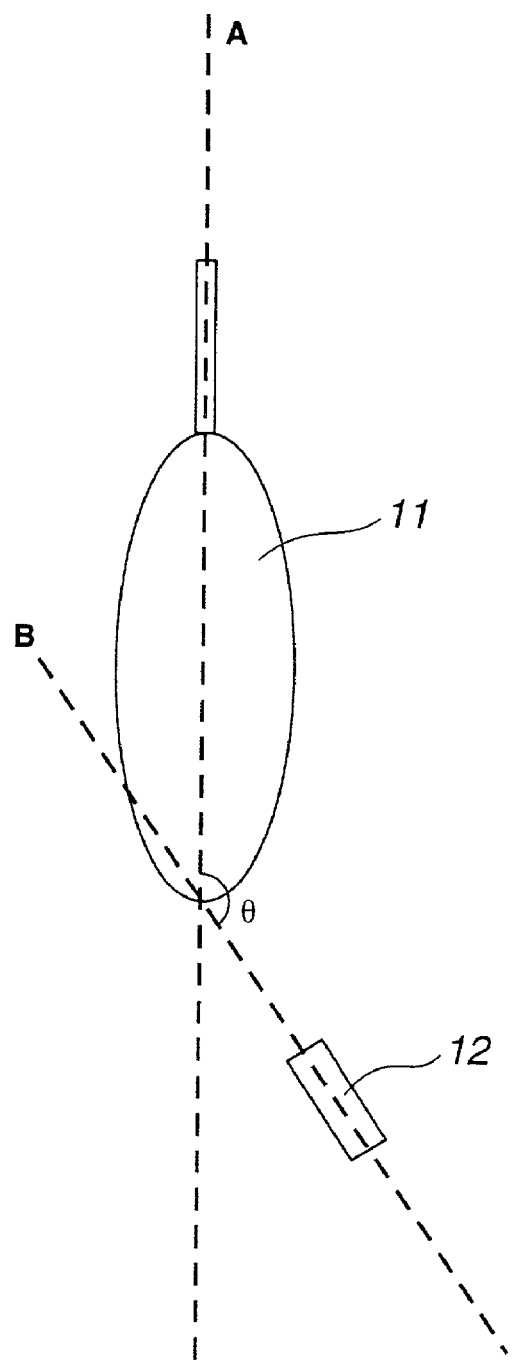
FIG. 2 illustrates the angle between the center axis of the porous silica matrix and the center axis of the stream of fluorine compound gas fed from the burner.

Specifically, referring to FIG. 2, an angle θ of 120 to 150° is preferred. In FIG. 2, a burner 12 is adapted to feed a fluorine compound toward a porous silica matrix 11. The porous silica matrix 11 has a center axis A, and the stream of fluorine compound gas fed from the burner 12 has a center axis B oriented at an angle θ to the center axis A of the porous silica matrix 11.

For fluorine doping of the porous silica matrix to take place at the center of the matrix rather than on its periphery, center axis B should preferably intersect center axis A at the front end of the porous silica matrix 11.

To enable efficient production of the quartz glass, it is preferable for the porous silica matrix to have a bulk density of at least 0.1 g/cm$^3$, more preferably 0.1 to 0.7 g/cm$^3$, and most preferably 0.3 to 0.7 g/cm$^3$.

The porous silica matrix formed in the process described above is vitrified in a high-temperature glassmaking furnace under a fluorine atmosphere. Vitrification may be carried out using a known method and conditions, such as heating and vitrifying in a mixed gas atmosphere composed of a fluorine compound gas and an inert gas to a temperature of 1,200 to 1,700° C. The fluorine compound gas may be selected from among such fluorine compounds as $SiF_4$, $CHF_3$ and $CF_4$. Suitable inert gases include helium, argon and nitrogen. The concentration of fluorine compound is preferably at least 0.01 vol %. Following vitrification, the quartz glass is cooled to room temperature within the same glassmaking furnace by quenching, slow cooling or radiation cooling.

Next, it is advantageous to carry out hydrogen doping by heat treating the resulting fluorine-containing quartz glass in a hydrogen gas atmosphere. The purpose of such treatment is to use hydrogen atoms to compensate for structural defects such as E' centers that may form when the quartz glass is exposed to excimer laser irradiation The number of precursors (e.g., Si—Si bonds) to such paramagnetic defects is considerably reduced in the vitrifying method according to the invention, but hydrogen heat treatment further strengthens the ultraviolet light resistance of the quartz glass.

A known method and known conditions may be used to carry out hydrogen heat treatment. For example, it is advantageous to mix hydrogen gas with an inert gas such as helium or argon, and hold the system at a pressure of 1 to 10 MPa and a temperature of 300 to 600° C. to dope the fluorine-containing quartz glass with 1 to 3 vol % of hydrogen.

Vitrification of the porous silica matrix in a fluorine atmosphere and subsequent hydrogen doping may be carried out as consecutive steps.

To minimize the decline in light transmittance due to absorption attributable to the presence of Si—OH bonds, the synthetic quartz glass produced by the above-described sequence of steps according to the invention has a hydroxyl group concentration of preferably not more than 0.002 wt %, and most preferably not more than 0.0001 wt %.

The synthetic quartz glass produced by the inventive process has a fluorine atom concentration of preferably at least 0.01 wt %, more preferably at least 0.5 wt %, and most preferably at least 2 wt %. The synthetic quartz glass has a hydrogen atom concentration of preferably at least $1 \times 10^{17}$ molecules/cm$^3$, more preferably at least $3 \times 10^{17}$ molecules/cm$^3$, and most preferably at least $1 \times 10^{18}$ molecules/cm$^3$.

EXAMPLE

Examples of the invention and comparative examples are given below by way of illustration, and not by way of limitation. The production conditions used in the examples are not intended to restrict the scope of the invention.

Example 1

A porous silica matrix was produced by feeding from a burner 2.8 m$^3$/h of hydrogen gas, 4.0 m$^3$/h of oxygen gas, and both 1,000 g/h of tetramethoxysilane and 0.06 m$^3$/h of SiF$_4$ as the silica-forming raw materials, and carrying out hydrolysis in an oxyhydrogen flame. The angle θ between the center axis of the matrix and the center axis of the stream of SiF$_4$ gas fed from the burner was adjusted to 150°. The resulting porous silica matrix had a bulk density of 0.4 g/cm$^3$.

The porous silica matrix was heated in a SiF$_4$ atmosphere within a high-temperature glassmaking furnace to effect melting and vitrification, thereby forming a synthetic quartz glass. The SiF$_4$ gas was introduced into the furnace at a flow rate of 0.06 m$^3$/h. Vitrification took 5 hours.

The synthetic quartz glass produced under these conditions was then cut off, and fabricated into samples optically polished on both sides and having a diameter of 110 mm and a thickness of 6.3 mm.

The fluorine atom concentration within the quartz glass, as measured by electron probe microanalysis, was 2.3 to 2.4 wt % from the center to the outer periphery of the sample. The hydroxyl group concentration was 0 wt %.

Figure 3:
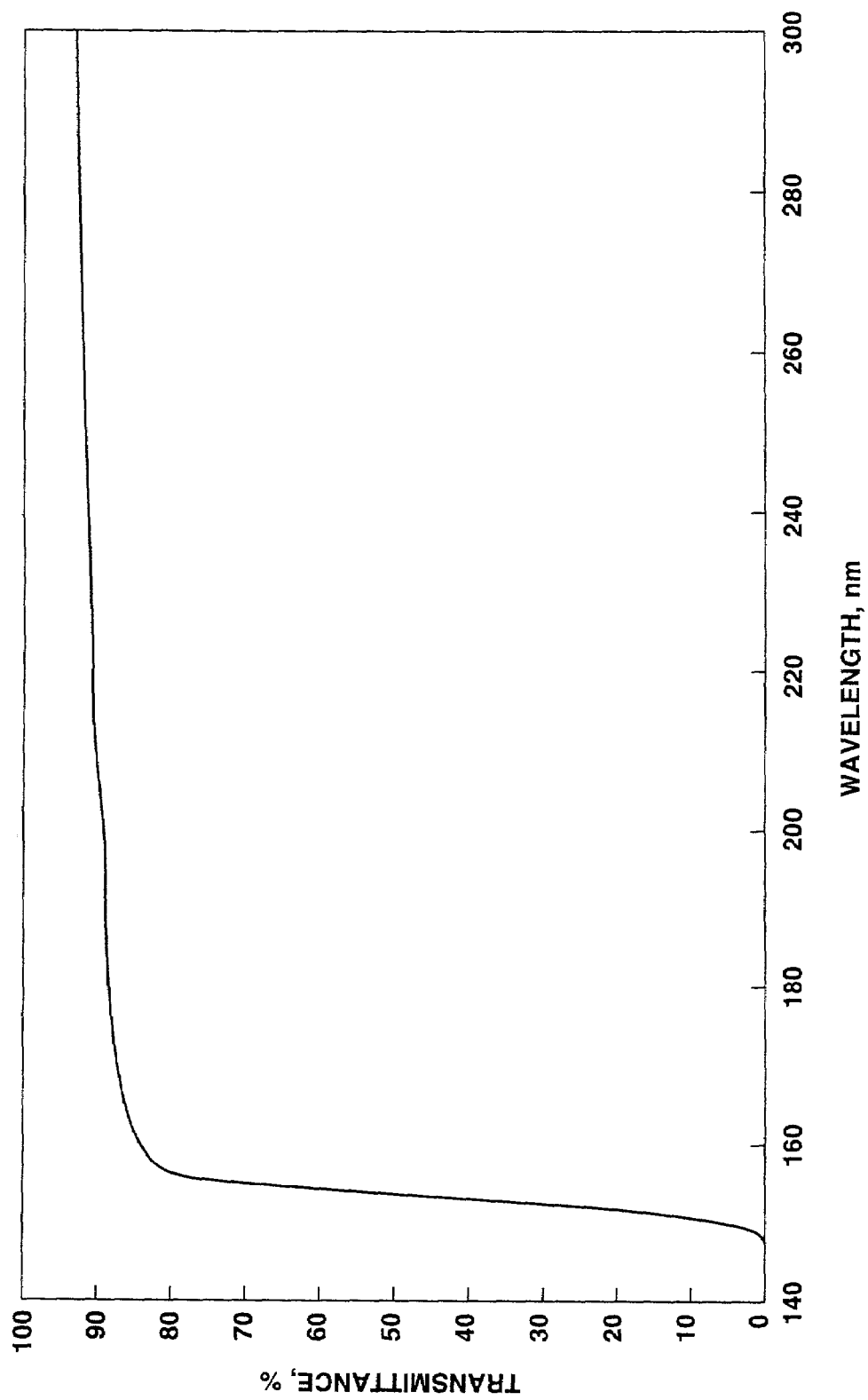
FIG. 3 is a plot of the vacuum ultraviolet light transmittance by synthetic quartz glass produced under the conditions of Example 1 according to the invention.

The transmittance of the sample to vacuum ultraviolet light was measured at the center and outer periphery of the sample. As shown in FIG. 3, the transmittance was very high within a wavelength range of 155 to 300 nm. No substantial difference was observed between the transmittance at the center of the sample and the transmittance at the outer periphery. Indeed, in FIG. 3, the plots of transmittance at the center and at the periphery overlap completely. Transmittance to 157.6 nm radiation, both at the center and the outer periphery of the sample, was 83%.

Example 2

A porous silica matrix was produced by feeding from a burner 2.5 m$^3$/h of hydrogen gas, 3.5 m$^3$/h of oxygen gas, and both 800 g/h of tetramethoxysilane and 0.04 m$^3$/h of SiF$_4$ as the silica-forming raw materials, and carrying out hydrolysis in an oxyhydrogen flame. The angle θ between the center axis of the matrix and the center axis of the stream of SiF$_4$ gas fed from the burner was adjusted to 130°. The resulting porous silica matrix had a bulk density of 0.5 g/cm$^3$.

The porous silica matrix was heated in a mixed gas atmosphere of SiF$_4$ and helium within a high-temperature glassmaking furnace to effect melting and vitrification, thereby forming a synthetic quartz glass. The SiF$_4$ gas and helium gas were introduced into the furnace at respective flow rates of 0.04 m$^3$/h and 0.02 m$^3$/h. Vitrification took 5 hours.

The synthetic quartz glass produced under these conditions was then cut off, and fabricated into samples optically polished on both sides and having a diameter of 110 mm and a thickness of 6.3 mm.

The fluorine atom concentration within the quartz glass, as measured by electron probe microanalysis, was 2.0 to 2.1 wt % from the center to the outer periphery of the sample. The hydroxyl group concentration was less than 0.0001 wt %.

The transmittance to vacuum ultraviolet light was measured at the center and outer periphery of the sample. No substantial difference was observed in the transmittances, which were good within a wavelength region of 155 to 300 nm.

Example 3

A porous silica matrix was produced by feeding hydrogen gas, oxygen gas, and both tetramethoxysilane and SiF$_4$ as the silica-forming raw materials from a burner under the same gas conditions as in Example 1. The angle θ between the center axis of the matrix and the center axis of the stream of SiF$_4$ gas fed from the burner was adjusted to 150°. The resulting porous silica matrix had the same bulk density of 0.4 g/cm$^3$ as in Example 1.

The porous silica matrix was melted and vitrified under the same conditions as in Example 1, and the resulting synthetic quartz glass was heat-treated at 500° C. for 100 hours in a mixed gas atmosphere of hydrogen and helium. During heat treatment, the H$_2$ concentration was 3 vol % and the pressure was 10 MPa.

The synthetic quartz glass produced under these conditions was then cut off, and fabricated into samples optically polished on both sides and having a diameter of 110 mm and a thickness of 6.3 mm.

The fluorine atom concentration within the quartz glass, as measured by electron probe microanalysis, was 2.3 to 2.4 wt % from the center to the outer periphery of the sample. The hydroxyl group concentration was 0 wt %.

The hydrogen atom concentration, as measured by Raman spectroscopy, was $3 \times 10^{18}$ molecules/cm$^3$.

The transmittance to vacuum ultraviolet light was measured at the center and outer periphery of the sample. No substantial difference was observed in the transmittances, which were good within a wavelength region of 155 to 300 nm. Transmittance to 157.6 nm radiation, both at the center and outer periphery of the sample, was 85%, which was higher than in Example 1.

Comparative Example 1

A porous silica matrix was produced by feeding hydrogen gas, oxygen gas, and tetramethoxysilane as the silica-forming raw material from a burner under the same gas conditions as in Example 1. SiF$_4$ was not used. The angle θ between the center axis of the matrix and the center axis of the stream of silica-forming raw material gas fed from the burner was adjusted to 150°. The resulting porous silica matrix had the same bulk density of 0.4 g/cm$^3$ as in Example 1.

The porous silica matrix was heated in a SiF$_4$ atmosphere within a high-temperature glassmaking furnace to effect melting and vitrification, thereby forming a synthetic quartz glass. The SiF$_4$ gas was introduced into the furnace at a flow rate of 0.06 m$^3$/h. Vitrification took 5 hours.

The synthetic quartz glass produced under these conditions was then cut off, and fabricated into samples optically polished on both sides and having a diameter of 110 mm and a thickness of 6.3 mm.

The fluorine atom concentration within the quartz glass, as measured by electron probe microanalysis, ranged from 1.4 to 2.1 wt % from the center to the outer periphery of the sample, indicating a very large difference between the center and peripheral portions. The hydroxyl group concentration was less than 0.0001 wt %.

Figure 4:
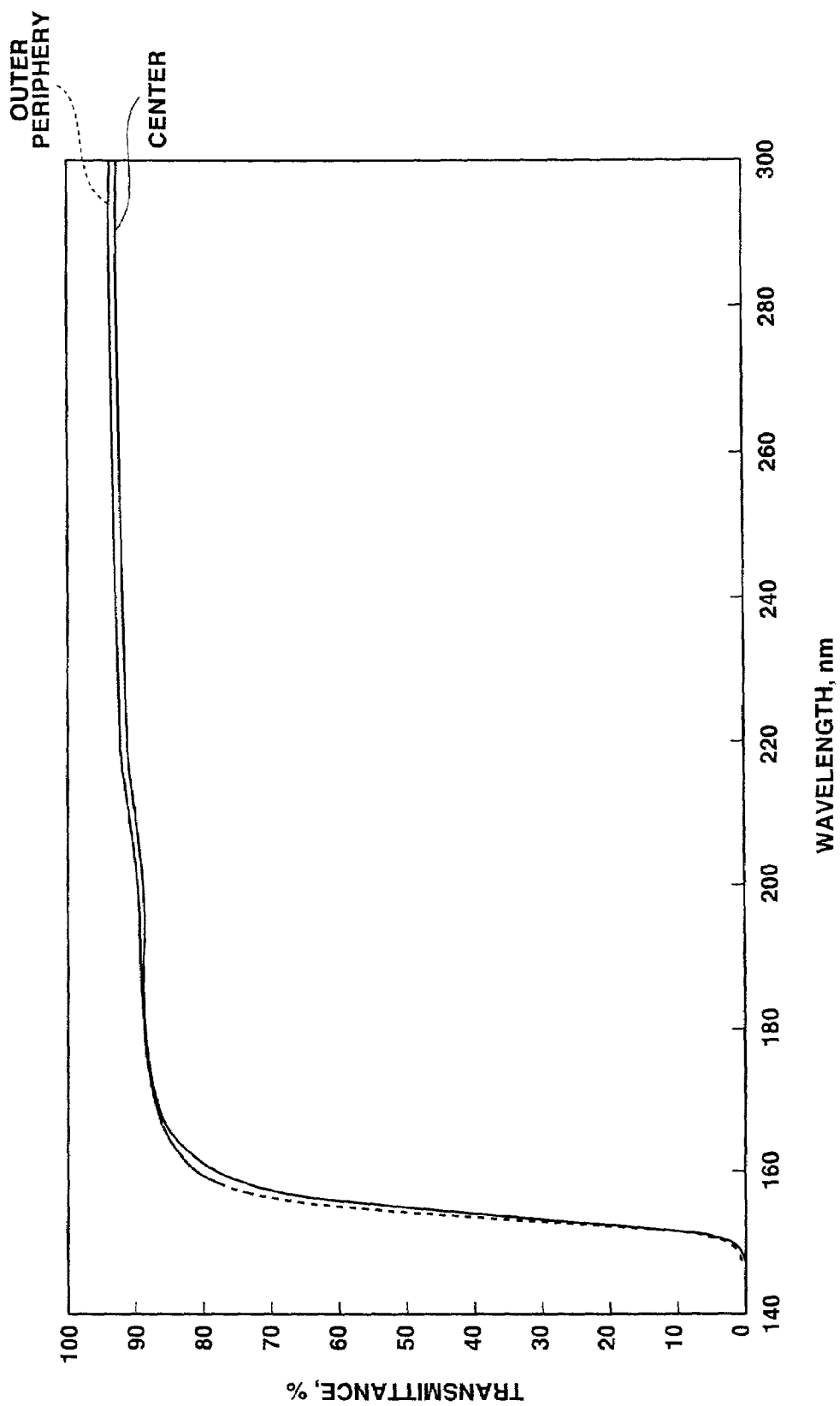
FIG. 4 is a plot of the vacuum ultraviolet light transmittance by synthetic quartz glass produced under the conditions of Comparative Example 1.

The transmittance of the sample to vacuum ultraviolet light was measured at the center and outer periphery of the sample. As shown in FIG. 4, the transmittance was relatively high within a wavelength range of 155 to 300 nm, but a difference was observed between the transmittance at the center of the sample and the transmittance at the periphery. The difference in transmittance was particularly large in the vacuum ultraviolet region at wavelengths smaller than 165 nm. The transmittance to 157.6 nm radiation was 73% in the center portion, and 78% at the outer periphery.

By producing a fluorine-containing porous silica matrix, and heating and vitrifying the matrix in a fluorine compound gas-containing atmosphere, the inventive process enables the low-cost manufacture of synthetic quartz glass having a higher and more uniform transmittance to light in the vacuum ultraviolet region than has hitherto been achieved.

Japanese Patent Application No. 2000-045657 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for producing synthetic quartz glass, comprising the steps of:
   feeding a silica-forming raw material gas, hydrogen gas, oxygen gas and a fluorine compound gas from a burner to a reaction zone,
   flame hydrolyzing the silica-forming raw material gas in the reaction zone to form fine particles of fluorine-containing silica,
   depositing the silica fine particles on a rotatable substrate in the reaction zone so as to create a fluorine-containing porous silica matrix having a fluorine atom concentration which increases from the outer periphery toward the center portion of the matrix, and
   heating and vitrifying the porous silica matrix in a fluorine compound gas-containing atmosphere.

2. The synthetic quartz glass production process of claim 1 in which, during formation of the porous silica matrix, the silica matrix and the flow of said fluorine compound gas from said burner are oriented such that their respective center axes describe an angle therebetween of 120 to 150°.

3. The synthetic quartz glass production process of claim 1, further comprising, after said heating and vitrifying, heat treating the synthetic quartz glass in a hydrogen gas atmosphere.

4. The synthetic quartz glass production process of claim 1, wherein the porous silica matrix has a bulk density of at least 0.1 g/cm³.

5. A process according to claim 1, wherein said silica-forming raw material is a chlorosilane compound, a silane or siloxane compounds of formulas (I) to (III) below, or mixtures thereof:

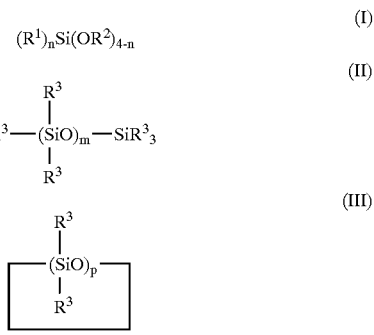

wherein $R^1$ and $R^2$ are each independently an aliphatic monovalent hydrocarbon group; $R^3$ is a hydrogen atom or an aliphatic monovalent hydrocarbon group; the letter n is an integer from 0 to 3; m is an integer of at least 1; and p is an integer from 3 to 5.

6. A process according to claim 5, wherein $R^1$ and $R^2$ are each independently $C_{1-4}$ alkyl, $C_{3-6}$ cycloalkyl, or $C_{2-4}$ alkenyl and $R^3$ is H, $C_{1-4}$ alkyl, $C_{3-6}$ cycloalkyl, or $C_{2-4}$ alkenyl.

7. A process according to claim 1, wherein said silica-forming raw material is $SiCl_4$, $(CH_3)_2SiCl_2$, $Si(OCH_3)_4$, $Si(OCH_2CH_3)_4$, $CH_3Si(OCH_3)_3$, hexamethyldisiloxane, tetrafluorosilane, trifluoromethane, tetrafluoromethane or mixtures thereof.

8. A process according to claim 1, wherein silica-forming raw material gas and said fluorine compound gas are fed into said reaction zone from a center nozzle of said burner, oxygen gas is fed into said reaction zone from a second nozzle of said burner located outside of said center nozzle, and oxygen gas, hydrogen gas or both are fed into said reaction zone from one or more nozzles located outside of said second nozzle.

9. A process according to claim 8, wherein hydrogen gas is fed into said reaction zone from a third nozzle of said burner located outside of said second nozzle, and oxygen gas is fed into said reaction zone from a fourth nozzle of said burner located outside of said third nozzle.

10. A process according to claim 4, wherein the porous silica matrix has a bulk density of 0.1–0.7 g/cm³.

11. A process according to claim 10, wherein the porous silica matrix has a bulk density of 0.3–0.7 g/cm³.

12. A process according to claim 1, wherein said heating and vitrifying is performed in a mixed gas atmosphere containing a fluorine compound gas and an inert gas at a temperature of 1,200 to 1,700° C., and said fluorine compound gas is $SiF_4$, $CHF_3$ or $CF_4$.

13. A process for producing synthetic quartz glass, comprising the steps of:
   feeding a silica-forming raw material gas, hydrogen gas, oxygen gas and a fluorine compound gas from a burner to a reaction zone,
   flame hydrolyzing the silica-forming raw material gas in the reaction zone to form fine particles of fluorine-containing silica,
   depositing the silica fine particles on a rotatable substrate in the reaction zone so as to create a fluorine-containing porous silica matrix, and
   heating and vitrifying the porous silica matrix in a fluorine compound gas-containing atmosphere,
   wherein said porous silica matrix has a bulk density of at least 0.1 g/cm³ and the fluorine concentration thereof increases from the outer periphery toward the center of the matrix.

* * * * *